126,283

UNITED STATES PATENT OFFICE.

CHARLES H. FRINGS, OF CENTRAL, MISSOURI, ASSIGNOR TO HIMSELF AND CHARLES BRACHES, OF SAME PLACE.

IMPROVEMENT IN TREATING CEREAL GRAINS FOR MASHING.

Specification forming part of Letters Patent No. 126,283, dated April 30, 1872; antedated April 20, 1872.

Specification describing a certain Improvement in Treating Grain and Cereals for Mashing, invented by CHARLES H. FRINGS, of Central Post-Office, in the county of St. Louis and State of Missouri.

This invention relates to certain improvements on the process of treating grain and other cereals for which Letters Patent No. 113,997 were granted to me on the 25th day of April, 1871; and the object of the present invention is to simplify the process of mashing described in the said Letters Patent.

Later investigations have satisfied me that the nitrogenous parts of grain—the "proteine" —will remain effective as yeast, forming substances to the fullest extent, even if the grain has been disclosed by alkalies at a high temperature and the mash subsequently neutralized by means of acids.

I therefore proceed as follows: The grain or cereal to be used, after having been ground to as fine a state as practicable, is, without further preparation, conveyed to the mash-tub, which contains about twenty to twenty-five gallons of water and from one to two ounces of caustic soda, or an equivalent amount of other caustic alkalies, to every bushel of grain or cereals to be mashed. Heat is then applied and the temperature of the contents of the mash-tub raised to about 185° Fahrenheit for rice and corn, and about 155° Fahrenheit for rye, barley, wheat, or other grain. This degree of heat is retained for about fifteen minutes. The grain in the tub is, by the cauterization produced by the alkalies, and powerfully sustained by the heat, more completely disclosed than can be done by any other process. Before cooling, the mash must be transferred from the alkaline to a sour reaction, so as not to prevent the saccharization of the starch by the malt, nor produce an injurious formation of lactic acid. For this purpose as much muriatic acid, either pure or mixed with other acid to the proper extent, is added to the mash as will insure a marked sour reaction. The acids best adapted to such combination with muriatic acid are phosphoric, sulphuric, nitric, oxalic, tartaric, and citric. The requisite proportion of acid depends upon the greater or less purity of alkalies used. For one ounce of caustic soda of commerce about two and one-half to three ounces of muriatic acid of commerce will be required for the proper saturation. The mash is next saccharified at the proper temperature and subjected to fermentation.

Having thus described my invention, I claim as new and desire to secure by Letters Patent—

1. The application to grain or cereals of heated solution of caustic soda or other caustic alkalies, as specified.

2. The application to the mash, while the same is in alkaline solution, of acid, as specified.

3. The herein-described process of mashing grain or cereals.

CHAS. H. FRINGS.

Witnesses:
 HENRY HIEMENZ,
 BERNARD BROOKHAGEN.